US00RE35453E

United States Patent [19]

Rodgers

[11] E Patent Number: Re. 35,453

[45] Reissued Date of Patent: Feb. 18, 1997

[54] SPRING UNIT ASSEMBLY

[75] Inventor: Paul Rodgers, Manchester, Great Britain

[73] Assignee: Slumberland PLC, Oldham, England

[21] Appl. No.: 412,701

[22] Filed: Mar. 29, 1995

Related U.S. Patent Documents

Reissue of:

[64] Patent No.: 5,303,530
Issued: Apr. 19, 1994
Appl. No.: 870,628
Filed: Apr. 17, 1992

[63] Continuation of PCT/GB90/01602, Oct. 17, 1990.

[30] Foreign Application Priority Data

Oct. 18, 1989 [GB] United Kingdom ..... 8923528

[51] Int. Cl.[6] ..... B65B 9/02; B65B 61/24

[52] U.S. Cl. ..... 53/114; 53/138.5; 53/526; 53/553

[58] Field of Search ..... 53/114, 138.5, 53/545, 548, 553, 526, 552

[56] References Cited

U.S. PATENT DOCUMENTS

| | | | |
|---|---|---|---|
| 1,813,993 | 7/1931 | Gail | 53/114 |
| 1,994,043 | 3/1935 | Lofman et al. | 226/18 |
| 2,430,098 | 11/1947 | Binch | 5/353 |
| 2,983,236 | 5/1961 | Thompson | 112/2 |
| 3,668,816 | 6/1972 | Thompson | 53/28 |
| 4,377,061 | 3/1983 | Olson et al. | 53/433 |
| 4,439,977 | 4/1984 | Stumpf | 53/428 |
| 4,800,707 | 1/1989 | Rabus | 53/552 |
| 4,854,023 | 8/1989 | Stumpf | 29/91 |

FOREIGN PATENT DOCUMENTS

| | | |
|---|---|---|
| 655328 | 4/1929 | France . |
| 2905096 | 6/1980 | Germany . |
| 176699 | 7/1935 | Switzerland . |

*Primary Examiner*—Linda Johnson
*Attorney, Agent, or Firm*—Christensen, O'Connor, Johnson & Kindness, PLLC

[57] ABSTRACT

Apparatus for encapsulating spring units (38–40) is disclosed. The apparatus comprises a device (13) for inserting a spring unit between a pair of webs (16), a device (26) for tightening or tensioning the webs about the spring unit, and a securing device for securing the webs together in close proximity to the compressed spring unit to encapsulate same. A method for encapsulating spring units is also disclosed.

6 Claims, 3 Drawing Sheets

SPRING UNIT ASSEMBLY

Matter enclosed in heavy brackets [ ] appears in the original patent but forms no part of this reissue specification; matter printed in italics indicates the additions made by reissue.

*This application is a continuation of prior copending international PCT Application No. PCT/GB90/01602, filed Oct. 17, 1990, the benefit of the filing date which is hereby claimed under 35 U.S.C §120.*

This invention relates to apparatus for and a method of assembling and encapsulating spring units for use in mattresses or other upholstery units.

The term "spring unit" used herein means a plurality of spring coils arranged spatially in file and joined together by wire. The spring coils and joining wire may be formed separately and joined by a length or lengths of wire.

The term "web" used herein is to be construed as meaning cloth, fabric, laminated material or any other material used in, or capable of being used in, the production of mattresses and other upholstery units.

It is the aim of the present invention to provide an effective and economically viable apparatus for and method of providing assemblies of spring units for use in mattresses or other upholstery units.

According to one aspect of the present invention there is provided apparatus for encapsulating spring units as hereinbefore defined between a pair of webs as hereinbefore defined, the apparatus comprising an insertion device for inserting a spring unit between the pair of webs, means for tightening or tensioning the webs about the spring unit, compression means for compressing the spring unit, and securing means for securing the webs together in close proximity of the compressed spring unit to encapsulate same.

Preferably the securing means is a long arm sewing machine. Alternatively it could be a heat sealer depending upon the constitution of the webs.

The spring unit insertion device is preferably in channel or trough-shaped member which is withdrawable before, or as, the webs are tightened around the spring unit.

Preferably the web tensioning means comprises, at one side of the long arm sewing machine, a direction-reversible roller unit between which the webs are fed and, at the other side of the long arm sewing machine, a reciprocable puller bar.

Any other convenient tensioning arrangement can be employed.

Preferably the spring unit compression means is a pair of oppositely-movable pressing plates controlled by pneumatic rams.

Also according to another aspect of the present invention there is provided a method of encapsulating spring units between a pair of webs, the method compressing inserting a spring until between a pair of webs connected together along a line parallel with the spring unit, tensioning the webs around the spring unit, compressing the spring unit, and, while compressed, connecting the webs together in close proximity to the compressed spring unit at the other side of the spring unit from the first mentioned line of connection.

An embodiment of the present invention will now be described, by way of example, with reference to the accompanying diagrammatic drawings in which.

Figure 1:
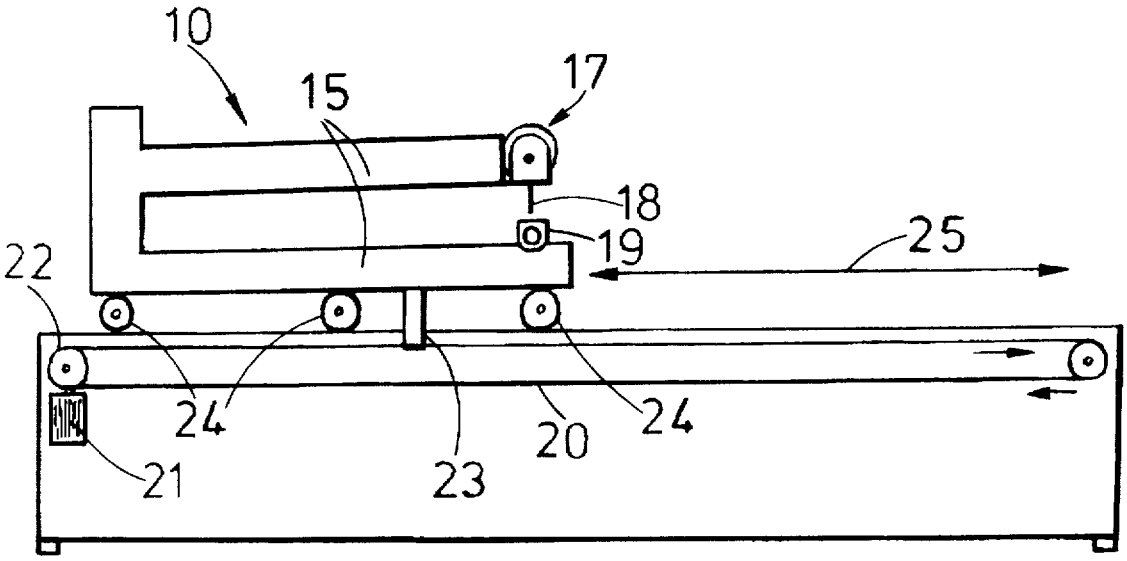
FIG. 1 is a side view of a long arm sewing machine used in the apparatus of the present invention.

The spring unit assembling and encapsulating apparatus comprises a long arm sewing machine 10 movable to-and-fro along a track 11, a web conveying and tensioning system 12, a spring unit insertion device 13, and a spring unit compression device 14.

Figure 3:
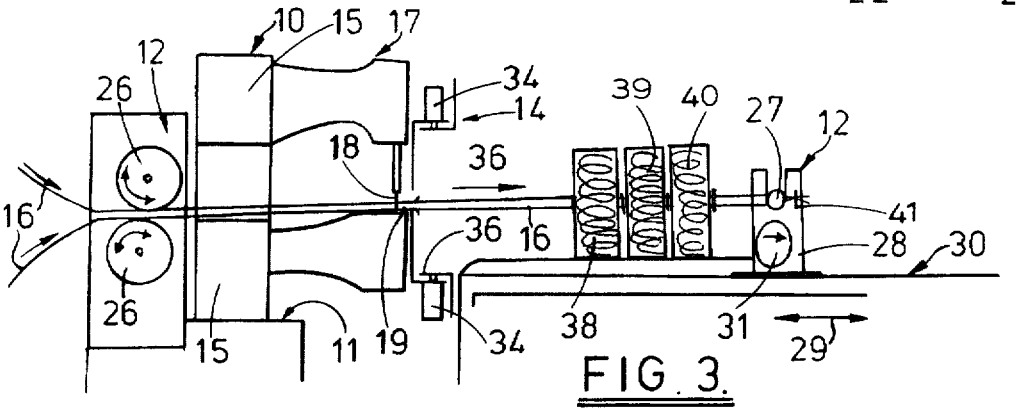
FIG. 3 is a general view of the layout of the apparatus according to the present invention and illustrating a first method step.

The general layout of the apparatus is most clearly seen in FIG. 3.

The long arm sewing machine 10 comprises parallel arms 15 between which parallel lengths of web 16 can pass the sewing machine 17 being carried laterally of the arms 15.

The sewing machine needle and bedplate are respectively indicated at 18 and 19 respectively.

The long arm sewing machine 10 is movable to-and-fro along the track 11 by an endless chain 20 driven by a reversible motor 21 and gear transmission 22, the sewing machine 10 being coupled to the endless chain 20 by a mechanical coupler 23 of any convenient form and being provided with wheels 24 for running along the track 11.

The effective stitching line of the long arm sewing machine 10 is indicated at 25.

The web conveying and tensioning system 12 comprises, at one side of the long arm sewing machine 10, a pair of direction-reversible, driven puller rollers 26, and, at the other side, a puller bar 27 releasably mounted on a carriage 28 which is movable to-and-fro as indicated at 29 across a pull-off table 30 by a motor 31 and suitable transmission (not shown).

The spring unit insertion device 13 is a channel or trough-shaped member 32 insertable manually or by power means, for example a ram, between the lengths of web 16. The channel or trough-shaped member 32 thus reciprocable to-and-fro in the direction of arrow 33.

The spring unit compression device 14 comprises a pair of double-acting pneumatic rams 34, whereof the piston rods are indicated at 35 and pressure plates at 36. The latter have lateral plates 37 which ensure that only one spring unit 30–40 at a time is within the compression device 14.

The use of a long arm sewing machine 10 permits lines of stitching to be effected very close to the spring unit compression device 14, for example as close to 20 mm. or thereabouts.

In use, two webs 16 are fed between the roller 26, are stitched together at 41, and the puller bar 27 is inserted therebetween and is then mounted on the carriage 28.

Figure 4:
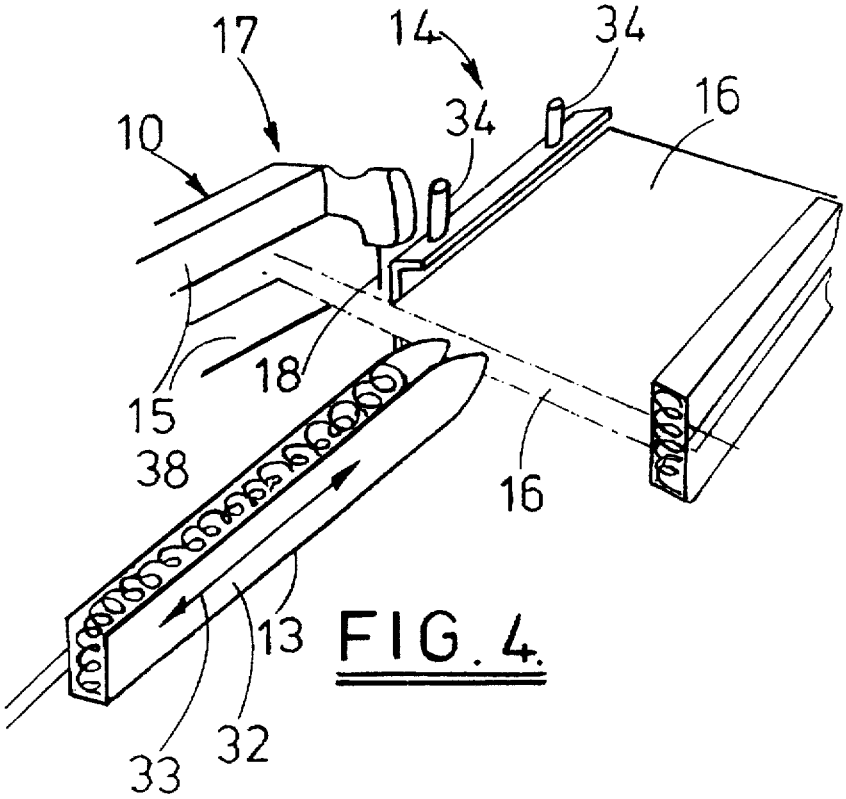
FIGS. 4 to 6 respectively illustrate the second, third and final actions of the apparatus.
Figure 2:
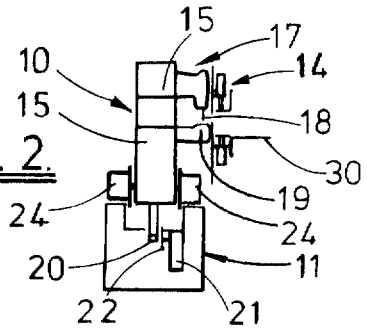
FIG. 2 is an end view of the sewing machine.
Figure 5:
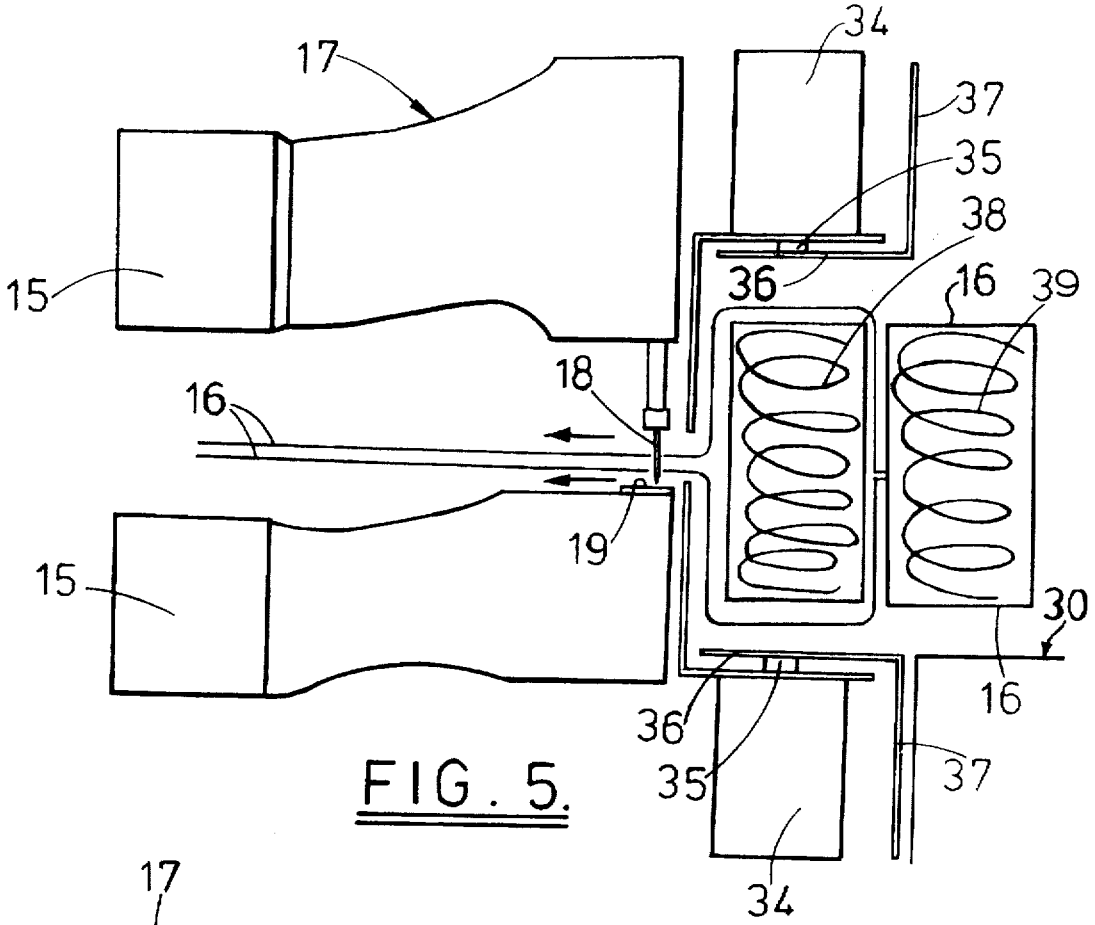

A first spring unit 38 is disposed in the channel or trough member 32 and inserted between the webs 16 at the compression unit 14 (FIG. 4), the rollers 26 being operated to tension the webs 16 around the spring unit 38, the channel or trough member 32 then being withdrawn, the compression unit 14 operated to compress the spring unit 38 and the long arm sewing machine 10 operated to stitch the webs 16 together closely adjacent the compressed spring unit 38 to encapsulate same (FIG. 5).

Figure 6:
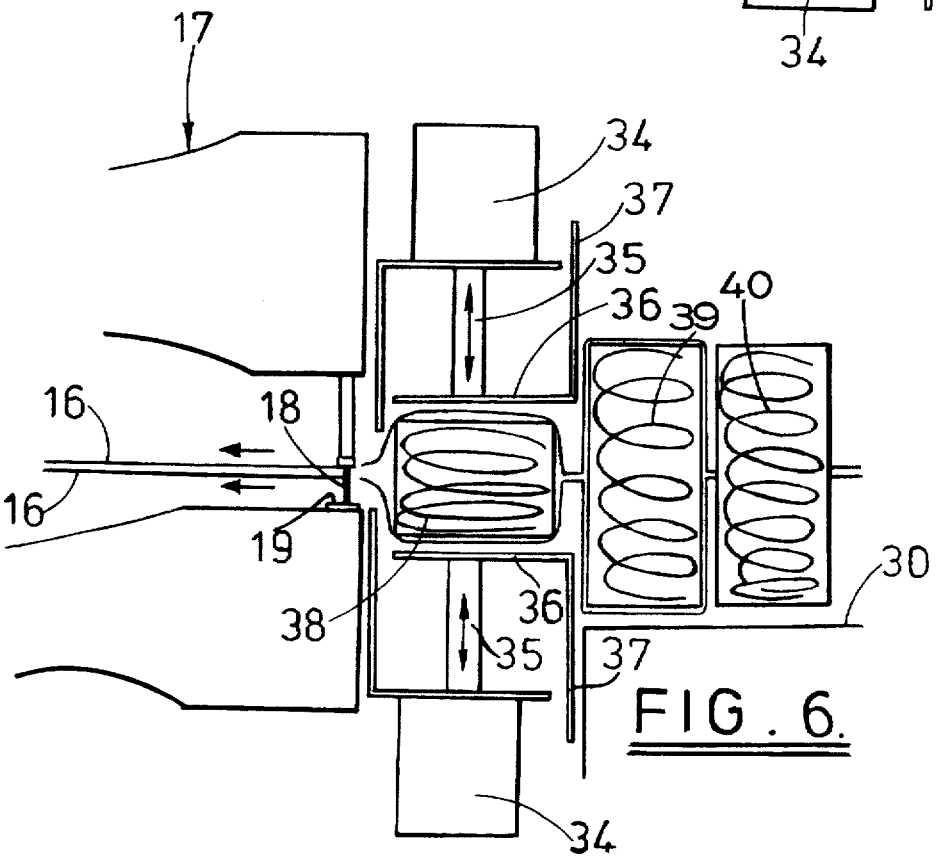

The compression unit 14 is then opened and the rollers 26 and the carriage 28 to move the encapsulated spring unit 38 away from the sewing machine 17 (FIG. 6).

A second spring unit 39 is then slid as aforesaid between the webs 16, is compressed, and is encapsulated by stitching as aforesaid, the rollers 26 pulling the webs 16 to tighten same around the second spring unit 39 prior to compression and encapsulation.

This action is repeated until all spring units are encapsulated.

The end product is a series of parallel spring units 38–40 individually encapsulated under compression between the webs 16.

The ends of the webs 16 at right angles to the spring units 38–40 are closed by stitching for example, and the encapsulated spring unit assembly can then be encased to form a mattress or other upholstery unit.

I claim:

1. Apparatus for encapsulating spring units between a pair of webs, comprising means for moving said webs in a first longitudinal direction through intermittent steps, an insertion device for holding said spring unit therein and for inserting a spring unit between said pair of webs, by linear movement in a second transverse direction normal to said first longitudinal direction, means for moving said insertion device through a linear path in said second transverse direction between a withdrawn spring unit receiving position spaced from said webs to receive a spring unit within said insertion device and an inserted position in which said insertion device is disposed between said webs, means for tightening or tensioning said webs around said spring insertion device, compression means outside of the webs for compressing said inserted spring unit within said webs into a compressed spring unit, means for withdrawing said insertion device from said inserted position to said withdrawn position as said webs are tightened around said compressed spring unit to retain said spring unit between said webs, and securing means also movable in said second direction for securing said webs together in close proximity to said spring unit to encapsulate said spring unit.

2. Apparatus according to claim 1, in which said securing means comprises a long arm sewing machine.

3. Apparatus according to claim 2, in which said means for tightening or tensioning said webs comprises, at one side of said long arm sewing machine, a direction reversible roller unit between which said webs are fed, and at the other side of said long arm sewing machine, a reciprocable puller bar.

4. Apparatus according to claim 1, in which said securing means comprises a heat sealer.

5. Apparatus according to claim 1, in which said insertion device comprises a channel or trough-shaped member adapted to be withdrawn from said webs as said webs are tightening around said spring unit.

6. Apparatus according to claim 1, in which said means for compressing said spring unit comprises a pair of oppositely-movable pressing plates, and pneumatic rams for controlling said pressing plates.

* * * * *